US009648214B2

(12) United States Patent
Mishra et al.

(10) Patent No.: US 9,648,214 B2
(45) Date of Patent: May 9, 2017

(54) MODULE FOR PLENOPTIC CAMERA SYSTEM

(71) Applicant: Nokia Technologies Oy, Espoo (FI)

(72) Inventors: Pranav Mishra, Bangalore (IN); Gururaj Putraya, Bangalore (IN)

(73) Assignee: Nokia Technologies Oy, Espoo (FI)

( * ) Notice: Subject to any disclaimer, the term of this patent is extended or adjusted under 35 U.S.C. 154(b) by 22 days.

(21) Appl. No.: 14/443,436

(22) PCT Filed: Apr. 26, 2013

(86) PCT No.: PCT/IB2013/053330
§ 371 (c)(1),
(2) Date: May 18, 2015

(87) PCT Pub. No.: WO2014/080299
PCT Pub. Date: May 30, 2014

(65) Prior Publication Data
US 2015/0319349 A1 Nov. 5, 2015

(30) Foreign Application Priority Data
Nov. 21, 2012 (IN) ............................ 4869/CHE/2012

(51) Int. Cl.
*H04N 5/222* (2006.01)
*H04N 5/225* (2006.01)

(52) U.S. Cl.
CPC ......... *H04N 5/2226* (2013.01); *H04N 5/2254* (2013.01); *H04N 5/2258* (2013.01)

(58) Field of Classification Search
CPC ... H04N 5/2226; H04N 5/2254; H04N 5/2258
See application file for complete search history.

(56) References Cited

U.S. PATENT DOCUMENTS

| 8,724,000 | B2* | 5/2014 | Georgiev | ............. | H04N 5/2254 |
| | | | | | 348/307 |
| 9,197,804 | B1* | 11/2015 | Or-Bach | ............ | H04N 5/23212 |
| 2002/0159030 | A1* | 10/2002 | Frey | ..................... | A61B 3/1015 |
| | | | | | 351/212 |
| 2008/0218612 | A1* | 9/2008 | Border | ..................... | G01S 19/45 |
| | | | | | 348/262 |
| 2009/0273843 | A1 | 11/2009 | Raskar et al. | ................ | 359/601 |
| 2011/0128423 | A1* | 6/2011 | Lee | .................. | H01L 27/14621 |
| | | | | | 348/294 |
| 2011/0175983 | A1 | 7/2011 | Park et al. | ........................ | 348/46 |
| 2013/0123015 | A1* | 5/2013 | Jung | ........................ | G06K 9/78 |
| | | | | | 463/37 |

FOREIGN PATENT DOCUMENTS

EP 2 133 726 A1 12/2009
WO WO 2009/036436 A2 3/2009

* cited by examiner

*Primary Examiner* — Nicholas Giles
(74) *Attorney, Agent, or Firm* — Harrington & Smith

(57) ABSTRACT

An apparatus including a substrate; a plurality of first image sensels supported by the substrate and arranged in rows and columns, wherein the substrate includes one or more apertures.

22 Claims, 3 Drawing Sheets

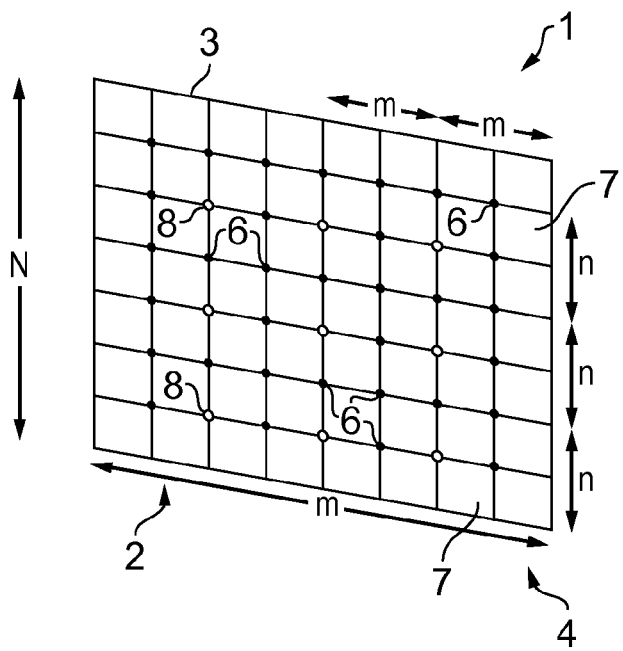
FIG. 1A
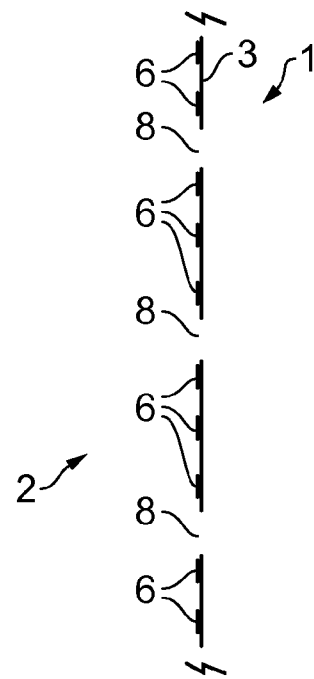
FIG. 1B
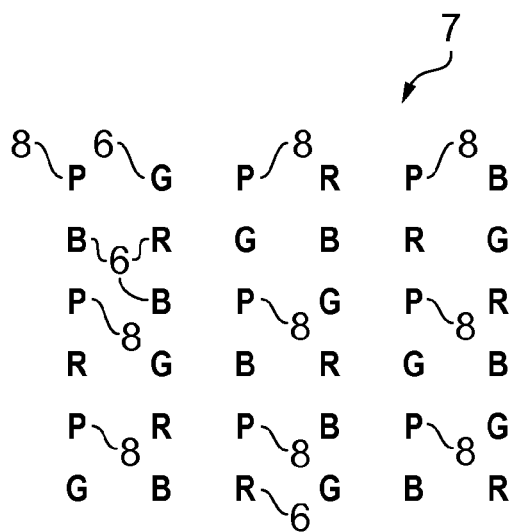
FIG. 2A
FIG. 2B

MODULE FOR PLENOPTIC CAMERA SYSTEM

TECHNOLOGICAL FIELD

Embodiments of the present invention relate to a module for a plenoptic camera system.

BACKGROUND

A plenoptic (or light field) camera simultaneously captures an image of a scene, through each one of multiple apertures. The multiple apertures may be provided as an array of microlenses.

BRIEF SUMMARY

According to various, but not necessarily all, embodiments of the invention there is provided an apparatus comprising: a substrate; and a plurality of first image sensels supported by the substrate and arranged in rows and columns, wherein the substrate comprises one or more apertures.

According to various, but not necessarily all, embodiments of the invention there is provided a method comprising: simultaneously capturing, from the same perspective at the same time, a first image with a single aperture camera and a second image with a multi-aperture plenoptic camera.

According to various, but not necessarily all, embodiments of the invention there is provided an apparatus comprising: at least one processor; and at least one memory including computer program code the at least one memory and the computer program code configured to, with the at least one processor, cause the apparatus at least to perform: simultaneously capturing, from the same perspective at the same time, a first image with a single aperture camera and a second image with a multi-aperture plenoptic camera.

According to various, but not necessarily all, embodiments of the invention there is provided an apparatus comprising: a support; a plurality of first image sensels distributed over the support, wherein a continuum in the distribution of the first image sensels over the support is interrupted by apertures through the support.

BRIEF DESCRIPTION

For a better understanding of various examples of embodiments of the present invention reference will now be made by way of example only to the accompanying drawings in which:

FIG. 1A illustrates an example of a first image sensor with apertures;

FIG. 1B illustrates a cross section through the first image sensor with apertures;

FIG. 2A illustrates one example of a sub-array of sensels which may be tessellated to create the first image sensor;

FIG. 2B illustrates an alternative sub-array of sensels;

Figure 5:
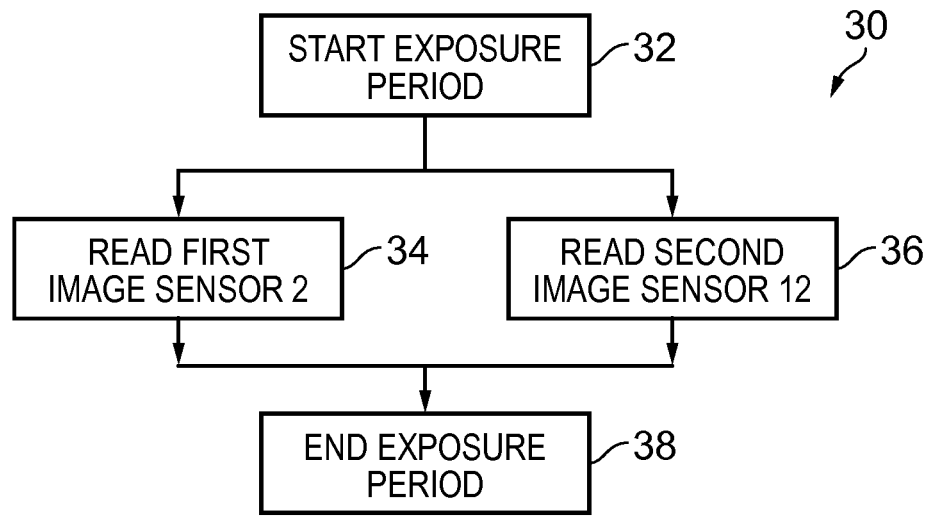
Figure 6:
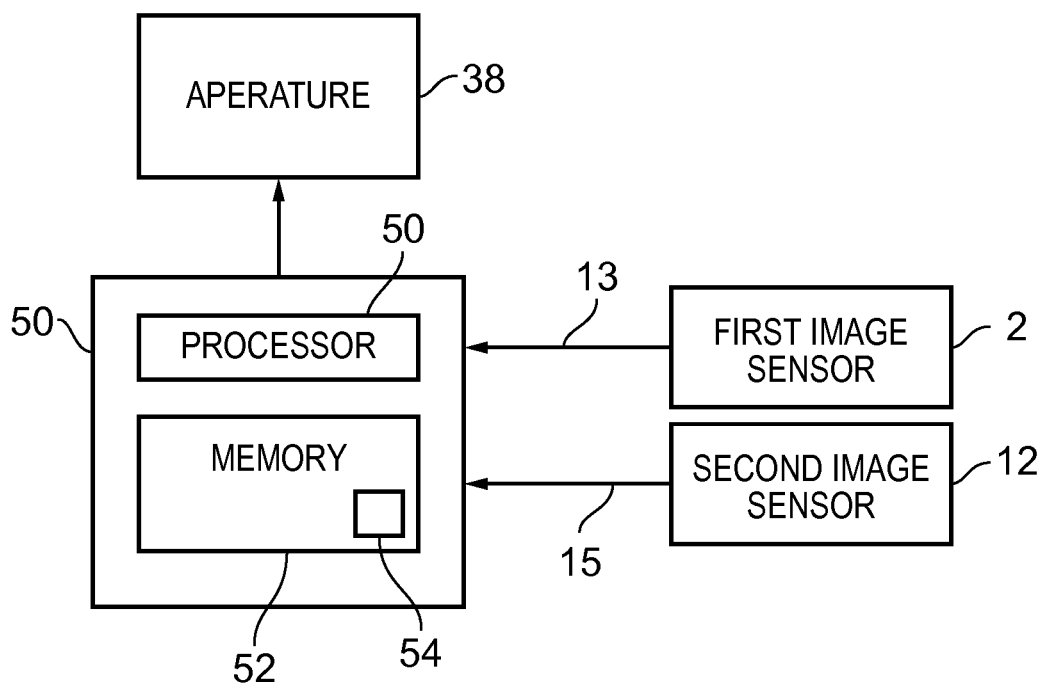

FIG. 5 schematically illustrates a method for simultaneously capturing a first image using the first image sensor and a second image using the second image sensor; and FIG. 6 schematically illustrates an example of the apparatus comprising a controller.

DETAILED DESCRIPTION

The Figures illustrate an apparatus comprising: a substrate 3; a plurality of first image sensels 2 supported by the substrate 3 and arranged in rows and columns, wherein the substrate 3 comprises one or more apertures 8.

FIG. 1A illustrates an example of an apparatus 1. In this example, the apparatus 1 is a first image sensor 2.

The first image sensor 2 comprises a substrate 3 which comprises one or more apertures 8 through the substrate 3. The substrate 3 supports a plurality of first image sensels 6 of the first image sensor 2. The plurality of first image sensels 6 are arranged, on one side of the substrate 3, along rows and columns of an array 4.

In this example, the rows and columns defined by the plurality of first image sensels 6 create a regular array 4. Where the rows and columns meet nodes of the array 4 are defined. Each of the plurality of first image sensels 6 is located at a node of the regular array 4. Also, in this example, each of the apertures 8 through the substrate 3 is located at a node of the regular array 8.

In the illustrated example the regular array 4 is a N row×M column array. The N×M array 4 can be divided into sub-arrays 7 of size n×m. Each of the sub-arrays is the same and comprises a through aperture 8 at the same location within the sub-array 7. The sub-arrays 7 are tessellated in rows and columns to form the N×M array. As a consequence, the apertures 8 are evenly distributed and regularly spaced.

FIG. 1B illustrates a cross section through the apparatus 1 illustrated in FIG. 1A. The substrate 3 comprises multiple apertures 8 that allow light to pass through the substrate 3. The substrate 3 also provides a support for the first image sensels 6 of the image sensor 2.

An image sensel 6 is a sensor element. It is the sensing equivalent to a pixel (picture element). The data recorded by a sensel 6 when reproduced as an image corresponds to a pixel.

FIG. 2A illustrates one example of a sub-array 7 which may be tessellated to create the image sensor 2. Other examples are possible.

In this figure, each of the image sensels 6 is illustrated as either a red image sensor R, a green image sensor G or a blue image sensor B. The colored image sensels 6 are arranged in a pattern. The apertures through the substrate are illustrated in FIG. 2 using P.

Within the sub-array 7, the apertures 8 are evenly distributed and regularly spaced. Furthermore, they are positioned so that within the sub-array 7 color balance is maintained.

In the absence of any apertures 8, the sub-array 7 would be a 6×6 array of 36 sensels comprising 12 red sensels, 12 blue sensels and 12 green sensels. However, in the illustrated configuration, there are 9 red sensels, 9 blue sensels, 9 green sensels and 9 apertures P.

The sensels 6 are arranged in a repeating red, green, blue sequence which is offset by one column for each subsequent row. The pattern of sensels therefore repeats every three rows. Within the sub-array 7, every fifth one of the red, green and blue sensels within the sub-array 7 is replaced by an aperture 8.

The size (area) of an aperture 8 (P) corresponds to the size (area) of a sensel 6.

FIG. 2B illustrates an alternative sub-array 7 of an image sensor 2. Other alternatives are possible.

The aperture 8 occupies a 2×2 sized space in the centre of the 4×4 array. Of the 16 nodes in the array, four of them are occupied by red sensels R, four are occupied by green sensels G and four are occupied by blue sensels B.

The size (area) of an aperture 8 (P) corresponds to the size (area) of 4 sensels 6 arranged as a 2×2 array.

Figure 3A:
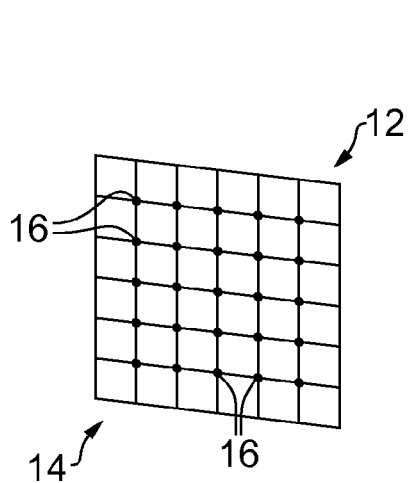
FIG. 3A illustrates a second image sensor.

FIG. 3A illustrates a second image sensor 12 that comprises a plurality of second image sensels 16 arranged in a regular array 14 of columns and rows.

In this example, the array 14 has the same resolution N×M as the array 4 described in relation to FIGS. 1A, 1B.

Figure 3B:
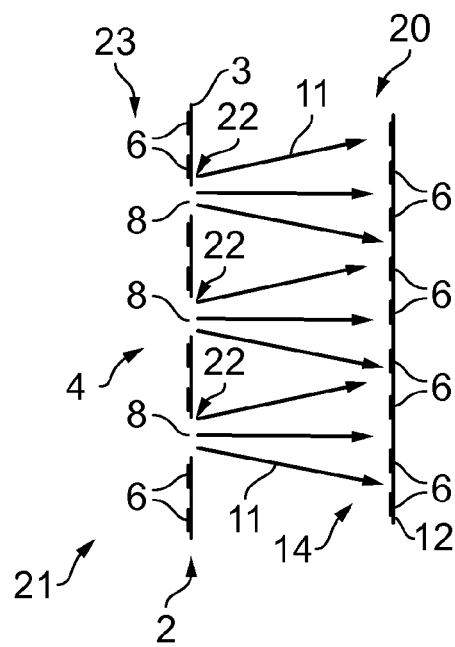
FIG. 3B illustrates a dual camera system comprising a single-aperture camera and a plenoptic camera.

FIG. 3B illustrates an apparatus 1, which in this example is a dual camera system 21 comprising a single-aperture camera 23 and a plenoptic camera 20. The single-aperture camera 23 and the focused plenoptic camera are aligned along the same optical axis.

The single-aperture camera 23 comprises the first image sensor 2 described in relation to FIGS. 1A, 1B, 2A and 2B. The first image sensor 2 captures a single image of a scene during an exposure period.

The plenoptic camera 20 comprises the second image sensor 12, described in relation to FIG. 3A. The second image sensor 12 captures multiple disparate images of the same scene through the multiple apertures 8 in the first image sensor 2 during an exposure period. The apertures 8 in the substrate 3 of the first image sensor 2 operate as plenoptic camera apertures 22. Light 11 passes through each of these apertures 22 and is sensed by the second image sensor 12. The combination of the plenoptic camera apertures 22 provided by the apertures 8 in the substrate 3 of the first image sensor 2 and the second image sensor 12 form the plenoptic camera 20.

The second image sensor 12, in this example, is arranged so that its imaging plane is parallel to the imaging plane of the first image sensor 2.

Referring back to the example of the first image sensor 2 illustrated in FIG. 1A, each aperture 8 is associated with an n×m sub-array of equivalent sensels 16 in the array 14 of the second sensor 12. The second sensor 12 therefore images the light received through a plenoptic camera aperture 22 on a n×m sub-array of sensels 12 as a sub-image. Consequently, the resolution of the sub-image formed from an plenoptic camera aperture 22 is significantly less than the resolution of the image formed by the first image sensor 2. However, N/m*M/m different sub-images are recorded by the second image sensor 12 simultaneously. The disparity of the sub-images provides significant additional depth information that is absent from the single image recorded by the first image sensor 2.

Therefore, it is possible for the first image sensor 2 and the second image sensor 12 to simultaneously image the same scene, from substantially the same perspective using the same exposure period. The first image sensor 2 will record, through a single aperture, a higher resolution single image of the scene. The second image sensor 12 will record a plurality of lower resolution images, each image corresponding to one of a plurality of plenoptic camera apertures 22.

Figure 4:
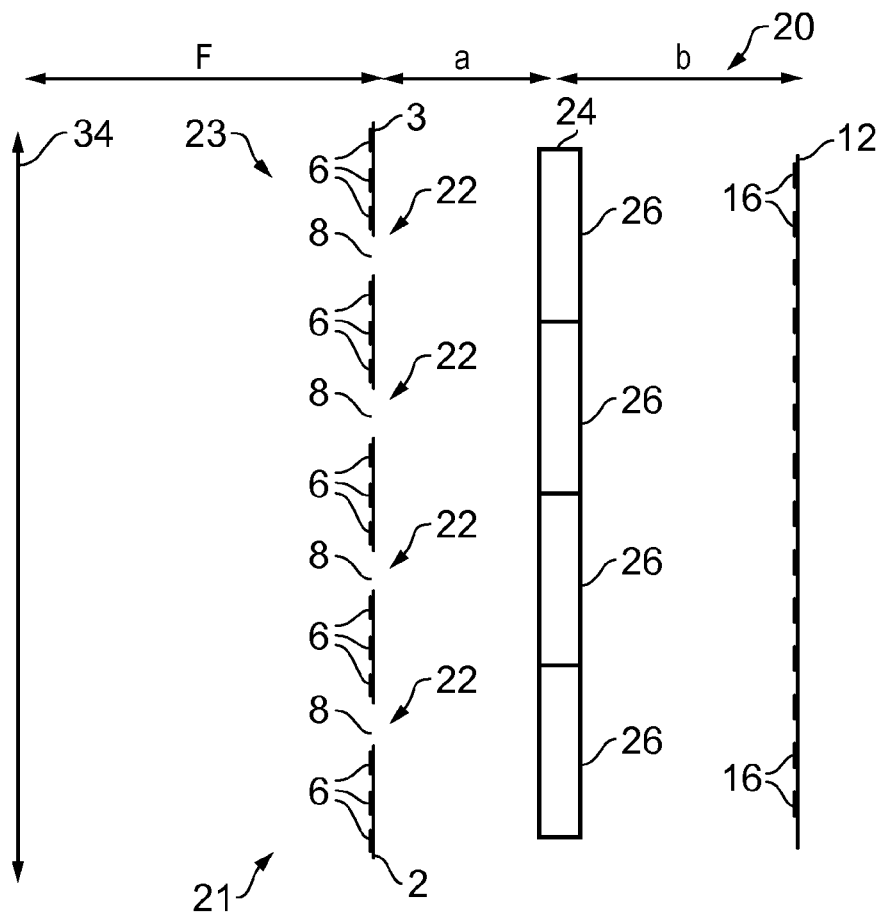
FIG. 4 illustrates a dual camera system 21 comprising a single-aperture camera and a focused plenoptic camera.

FIG. 4 illustrates an apparatus 1, which in this example is a dual camera system 21 comprises a single-aperture camera 23 and a focused plenoptic camera 20. The single-aperture camera 23 and the focused plenoptic camera are aligned along the same optical axis.

The single-aperture camera 23 comprises the first image sensor 2 described in relation to FIGS. 1A, 1B, 2A and 2B. The first image sensor 2 captures a single image of a scene. The apertures 8 of the first image sensor 2 provide plenoptic camera apertures 22 for the focused plenoptic camera 20.

The focused plenoptic camera 20 comprises the second image sensor 12, as previously described with reference to FIGS. 3A and 3B. The second image sensor 12 captures multiple disparate images of the same scene through the multiple apertures 8 in the first image sensor 2. The focused plenoptic camera 20 additionally comprises an array 24 of microlenses 26.

In this example, each of the microlenses has a focal length f. The array 24 of microlenses is arranged parallel to the imaging planes of the first image sensor 2 and the second image sensor 12 and at a first distance a from the imaging plane of the first image sensor 2. It is also arranged at a second distance b from the imaging plane of the second image sensor 12. The relationship between f, a, and b is: $1/f = 1/a + 1/b$.

Camera optics 34 placed in front of the first image sensor 2 has a focal length of F. The imaging plane of the first image sensor 2 lies in the focal plane of the camera optics 34. That is, the distance between the imaging plane of the first image sensor 2 and the optics 34 is F. Thus the plenoptic camera apertures 22 lie in the focal plane of the single-aperture camera 23.

Referring to the preceding figures, the second sensels 16 used in the second image sensor 12 may be more sensitive than the first image sensels 6 used in the first image sensor 2. This increased sensitivity may, for example, be achieved by using panchromatic image sensels at the second image sensor 12 instead of chromatic image sensels. Chromatic image sensels typically use color filters to provide chromatic sensitivity. Examples of such filters are Bayer filters.

By using the image sensels 16 of the second image sensor 12 without the color filters, increased sensitivity can be achieved. This increased sensitivity is useful as the intensity of light that reaches the second image sensor 12 is less than the intensity of light that reaches the first image sensor 2.

Although the second image sensor 12 is more sensitive, it doesn't provide color/chromatic information. However, chromatic information for the output of the second sensor 12 may be obtained from the output of the first image sensor 2. This may be achieved by determining a mapping between pixels of the second image and pixels of the first image and transferring the color information from the output of the first image sensor 2 to the output of the second image sensor 12 according to this mapping. This color transfer mapping is simple as both the first image sensor 2 and the second image sensor 12 have the same optical axis. An example of a color transfer process is described in the following paragraphs.

Let a first image be captured using the first image sensor 2 and a second image be captured simultaneously/contemporaneously using the second image sensor 12. The first image is captured through a single aperture and has a high resolution. The second image is captured through a plurality of plenoptic apertures 22. The second image is a light field image. The second image may be considered to be the combination of a plurality of sub-images, one for each plenoptic aperture 22. The resolution of a sub-image of the second image is less than the resolution of the first image. For each sub-image of the second image do the following to determine a color map for the each sub-image from a color map of the first image:

Consider a small area A around each pixel in a sub-image of the second image Let's say for a pixel co-ordinate $(x_p, y_p)$, the considered area is $A_p$.

Reconstruct the luminance channel for the first image captured by the first image sensor 2 for the Bayer captured pattern. Also reconstruct the color information for the first image sensor 2 using a demosaicing algorithm.

Consider an area W around the same pixel co-ordinate (i.e. (xp,yp)) in the luminance channel of first image. Let's say the window is Wp. The dimensions of the area Wp are greater than the dimensions of the area Ap.

Perform a correlation between the luminance map for area Wp and the area Ap for various shifts in relative positions e.g. x and y directions of the area Wp and the area Ap.

Find the shift which gives the best correlation score. Let the correlation score be best for a shift of (xs,ys) in the co-ordinate frame of the area Wp.

Transfer to the pixel (xp,yp) in the sub-image of the second image the corresponding color from the equivalent pixel (xp+xs, yp+ys) of the first image. The equivalent pixel may be an actual pixel or a virtual pixel determined from the neighboring pixels. Repeat for each pixel in the area Ap.

FIG. 5 schematically illustrates a method 30 for simultaneously capturing a first image using the first image sensor 2 and a second image using the second image sensor 12.

The first image is captured through a single aperture and has a high resolution.

The second image is captured through a plurality of plenoptic apertures 22. The second image is a light field image. The second image may be considered to be the combination of a plurality of sub-images, one for each plenoptic aperture 22. The resolution of a sub-image of the second image is less than the resolution of the first image.

At block 32 the exposure period starts. Exposure may, for example, be started by opening an aperture 42 (see FIG. 6) to the camera system which is common to the first image sensor 2 and the second image sensor 12.

During the exposure period and simultaneously, at block 34 the first image sensor 2 is read to produce the first image and the second image sensor 12 is read at block 36 to produce the second image. Subsequently at block 38, the aperture 42 is controlled to end the exposure period.

FIG. 6 schematically illustrates an example of the apparatus 1 comprising a controller 40 which is configured to control the camera system aperture 42 to start and end the exposure period. The controller 40 is also configured to simultaneously receive the first image 13 from the first sensor 2 and the second image 15 from the second image sensor 12.

Implementation of the controller can be in hardware alone (a circuit, a processor etc), have certain aspects in software including firmware alone or can be a combination of hardware and software (including firmware).

The controller may be implemented using instructions that enable hardware functionality, for example, by using executable computer program instructions in a general-purpose or special-purpose processor that may be stored on a computer readable storage medium (disk, memory etc) to be executed by such a processor.

In this example the controller 40 comprises a processor 50 which is configured to read from and write to a memory 52. The memory 52 comprises a computer program 54.

The processor 50 may be configured by the computer program 54 to process the first image 13 and the second image. It may also be configured to control output to a user interface device such as a display, for example.

For example, the controller 40 may process the first image 13 and compensate the first image 13 for absent pixels corresponding to the one or more apertures 8 in the first image sensor 2 used to capture the first image 13. Interpolation algorithms may be used for this correction.

For example, the controller 40 may process the second image 15 to obtain depth information. The processes required are publicly documented in relation to plenoptic cameras.

In addition, the controller 40 may be configured to simultaneously process the first image 13 and the second image 15. Advantageously, the first image 13 and the second image 15 are images of the same scene, at the same time, along the same optical axis. Therefore the accurate visual information in the first image and can be associated with the better depth information from the second image.

For example, the first image 13 may be augmented with depth information obtained from the second image 15. This may be used to provide a three-dimensional image.

For example, the depth information obtained from the second image 15 may be used to facilitate tracking of an object. As an example, the user may be shown the first image 13 from the first image sensor 2 in a camera viewfinder. The apparatus 1 may be configured to enable the user to select a region which should be tracked. As there is correspondence (alignment) between the first image sensor 2 and the second image sensor 12, it is possible to relate the position of the selected region in the first image 13 with an area of the second image 15/second image sensor 12. Depth information may be obtained specifically for that area. The object can then be tracked within the first images 13 produced by the first image sensor 2 and also within the second images 15 produced by the second image sensor 12. The apparatus 1 is therefore configured to track an object using the first camera sensor 2, the second camera sensor 12 or using both the first camera sensor 2 and the second camera sensor 12.

For example, the depth information obtained from the second image 15 may be used to facilitate machine recognition of an object in the first image 13. As an example, face detection may occur in relation to the first image 13. As there is alignment between the optical axis of the single-aperture camera 23 and that of the focused plenoptic camera, there is a known relationship between a position of an object in a first image 13 and the corresponding position of that object in the second image 15. The controller 40 is therefore able to process those parts of the second image 15 that correspond to the face in the first image 13 and obtain depth information for facial features. The depth information may be used to generate a three-dimensional image of the face that can rotated. This can be used to significantly improve recognition algorithms.

The controller 40 may store the first image and the second image in a memory for future retrieval and processing. The user of the apparatus 2 may selectively view the first image 13 or the second image 15.

The processor 50 is configured to read from and write to the memory 52. The processor 50 may also comprise an output interface via which data and/or commands are output by the processor 50 and an input interface via which data and/or commands are input to the processor 50.

The memory 52 stores a computer program 54 comprising computer program instructions that control the operation of the apparatus 1 when loaded into the processor 50. The computer program instructions 54 provide the logic and routines that enables the apparatus to perform the data processing and control methods described. The processor 50 by reading the memory 52 is able to load and execute the computer program 54.

The computer program may arrive at the apparatus 1 via any suitable delivery mechanism. The delivery mechanism may be, for example, a non-transitory computer-readable storage medium, a computer program product, a memory device, etc As used here 'module' refers to a unit or apparatus that excludes certain parts/components that would be added by an end manufacturer or a user. The first image sensor 2 may be a module. The dual camera system 21 may be a module. The modules may, for example, be incorporated into electronic devices such as, for example, hand-portable imaging devices.

The blocks illustrated in the FIG. 5 may represent steps in a method and/or sections of code in the computer program 54. The illustration of a particular order to the blocks does not necessarily imply that there is a required or preferred order for the blocks and the order and arrangement of the block may be varied. Furthermore, it may be possible for some blocks to be omitted.

Although embodiments of the present invention have been described in the preceding paragraphs with reference to various examples, it should be appreciated that modifications to the examples given can be made without departing from the scope of the invention as claimed.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. An apparatus comprising:
   a substrate;
   a plurality of first image sensors supported by the substrate and arranged in rows and columns, wherein the substrate comprises one or more apertures, and
   a second plurality of second image sensors configured as an image sensor for a plenoptic camera, wherein an array of microlenses is positioned between the substrate and the image sensor, and wherein the one or more apertures in the substrate are configured as plenoptic camera apertures.

2. The apparatus as claimed in claim 1, wherein each of the plurality of first image sensels is positioned at a node of a regular array and wherein each of the one or more apertures in the substrate is positioned at a node of the regular array wherein the nodes of the regular array are defined where rows and columns occupied by the plurality of first image sensels cross.

3. The apparatus as claimed in claim 1 wherein the one or more apertures in the substrate are evenly distributed and regularly spaced.

4. The apparatus as claimed in claim 1 wherein the sensels and apertures are arranged in a repeating pattern, the repeating pattern comprising, in order in a first row, a first color sensor, a second color sensor, a first color sensor and a second color sensor;
   comprising, in order in a second row, a third color sensor, an aperture, an aperture, and a third color sensor;
   comprising, in order in a third row, a first color sensor, an aperture, an aperture, and a second color sensor; and
   comprising, in order in a fourth row, a third color sensor, a second color sensor, a first color sensor, and a third color sensor.

5. The apparatus as claimed in claim 1, wherein each microlens in the array of microlenses has a focal length f, wherein the array of microlenses is positioned at a first distance a from the substrate and wherein a second image sensor is positioned at a second distance b from the array of microlenses, wherein $1/f=1/a+1/b$.

6. The apparatus as claimed in claim 1, wherein the second image sensels are more sensitive of light that the first image sensels.

7. The apparatus as claimed in claim 1, wherein the second image sensels are panchromatic.

8. The apparatus as claimed in claim 1, comprising camera optics defining a focal plane, wherein the plurality of first image sensels lies in the focal plane.

9. A method comprising:
   simultaneously capturing, from a same perspective at a same time, a first image with a plurality of first image sensels supported by a substrate of a single aperture camera and a second image with a second plurality of second image sensels configured as an image sensor of a multi-aperture plenoptic camera, wherein an array of microlenses is positioned between the substrate and the image sensor; and
   using apertures through the first image sensels of the single aperture camera and the array of microlenses to provide multiple apertures to the image sensor of the multi-aperture plenoptic camera.

10. The method as claimed in claim 9, wherein the single aperture camera provides a focused image.

11. The method as claimed in claim 9, arranging the plurality of first image sensels supported by the substrate in rows and columns, wherein the substrate comprises one or more apertures to capture the first image.

12. The method as claimed in claim 9, wherein the one or more apertures in the substrate are configured as plenoptic camera apertures to capture the second image.

13. The method as claimed in claim 9, comprising compensating the first image for absent pixels corresponding to the one or more apertures in the image sensor used to capture the first image.

14. The method as claimed in claim 9, comprising simultaneously processing the first image and the second image to provide depth information obtained from the second image in relation to the first image; and using processing of the second image to augment the first image.

15. The method as claimed in claim 14, comprising at least one of tracking an object and enabling recognition of an object in the first image.

16. The method as claimed in claim 9 comprising at least one of
   simultaneously processing the first image and the second image and using processing of the first image to augment the second image, and
   simultaneously processing the first image and the second image to provide color information obtained from the first image in relation to the second image.

17. A computer program product comprising computer program instructions embodied on a non-transitory memory that when loaded in to a processor performs:
   simultaneously capturing, from a same perspective at a same time, a first image with a plurality of first image sensels supported by a substrate of a single aperture camera and a second image with a second plurality of second image sensels configured as an image sensor of a multi-aperture plenoptic camera, wherein an array of microlenses is positioned between the substrate and the image sensor; and using apertures through the first image sensels of the single aperture camera and the array of microlenses to provide multiple apertures to the image sensor of the multi-aperture plenoptic camera.

18. The computer program product as claimed in claim 17, wherein the computer program instructions when loaded in to a processor performs: processing the second image captured with the multi-aperture plenoptic camera, from a same perspective at a same time as the first image, to obtain depth information.

19. The computer program product as claimed in claim 17, wherein the computer program instructions when loaded in to a processor performs: processing the first image and the second image captured with the multi-aperture plenoptic camera, from a same perspective at a same time as the first image, to augment the first image.

20. The computer program product as claimed in claim 17, wherein the computer program instructions when loaded in to a processor performs: processing the first image and the second image captured with the multi-aperture plenoptic camera, from a same perspective at a same time as the first image, to provide depth information obtained from the second image in relation to the first image.

21. The computer program product as claimed in claim 17, wherein the computer program instructions when loaded in to a processor performs: processing the first image and the second image captured with the multi-aperture plenoptic camera, from a same perspective at a same time as the first image, and using processing of the first image to augment the second image.

22. The computer program product as claimed in claim 17, wherein the computer program instructions when loaded in to a processor performs: processing the first image and the second image captured with the multi-aperture plenoptic camera, from a same perspective at a same time as the first image, to provide color information obtained from the first image in relation to the second image.

* * * * *

UNITED STATES PATENT AND TRADEMARK OFFICE
CERTIFICATE OF CORRECTION

| | | |
|---|---|---|
| PATENT NO. | : 9,648,214 B2 | Page 1 of 1 |
| APPLICATION NO. | : 14/443436 | |
| DATED | : May 9, 2017 | |
| INVENTOR(S) | : Pranav Mishra and Gururaj Putraya | |

It is certified that error appears in the above-identified patent and that said Letters Patent is hereby corrected as shown below:

In the Claims

In Claim 14:
Column 8, Line 46, "comprising" should be deleted and -- comprising at least one of -- should be inserted.

Signed and Sealed this
Fourth Day of July, 2017

Joseph Matal
*Performing the Functions and Duties of the*
*Under Secretary of Commerce for Intellectual Property and*
*Director of the United States Patent and Trademark Office*